United States Patent [19]

Fenton

[11] Patent Number: 4,824,460
[45] Date of Patent: Apr. 25, 1989

[54] MANUFACTURE OF PARISONS OF MOLTEN GLASS

[75] Inventor: Frank A. Fenton, Granby, Conn.

[73] Assignee: Emhart Industries, Inc., Farmington, Conn.

[21] Appl. No.: 236,574

[22] Filed: Aug. 25, 1988

[30] Foreign Application Priority Data

Sep. 4, 1987 [GB] United Kingdom ............... 8720848

[51] Int. Cl.⁴ ............................................. C03B 11/06
[52] U.S. Cl. ............................................ 65/68; 65/72; 65/76; 65/307; 65/318; 65/361
[58] Field of Search ................ 65/68, 72, 76, 77, 308, 65/318, 307, 358, 361

[56] References Cited

U.S. PATENT DOCUMENTS

| 2,328,662 | 9/1943 | Meredith et al. | 65/307 |
| 3,434,820 | 3/1969 | Zappia et al. | 65/307 X |
| 3,573,025 | 3/1971 | Hamilton | 65/318 X |
| 3,595,637 | 7/1971 | Eldred et al. | 65/318 |
| 4,288,240 | 9/1981 | Braithwaite | 65/361 X |

Primary Examiner—Arthur Kellogg
Attorney, Agent, or Firm—Spencer T. Smith

[57] ABSTRACT

Parisons of molten glass for subsequent moulding are molded in a mould cavity formed from one-piece lower portion (10), a dividable neck ring (14), and a dividable central mould portion (24). A gob of molten glass is introduced into a gov uide (58) so that the gob passes into the mould through the neck ring (14). A plunger guide (42) which serves to guide the plunger (26) through the neck ring (14) is introduced into the gob guide (58) and a plunger (26) is introduced into the plunger guide (42) so that the plunger enters the mould through the neck ring (14). During pressing of the glass, the guide (42) which serves to guide the plunger (26) through the neck ring (14) is pressed downwardly on to the neck ring (14). The guide (42) defines a sealing surface (54) of the neck portion (16) of the mould cavity.

5 Claims, 1 Drawing Sheet

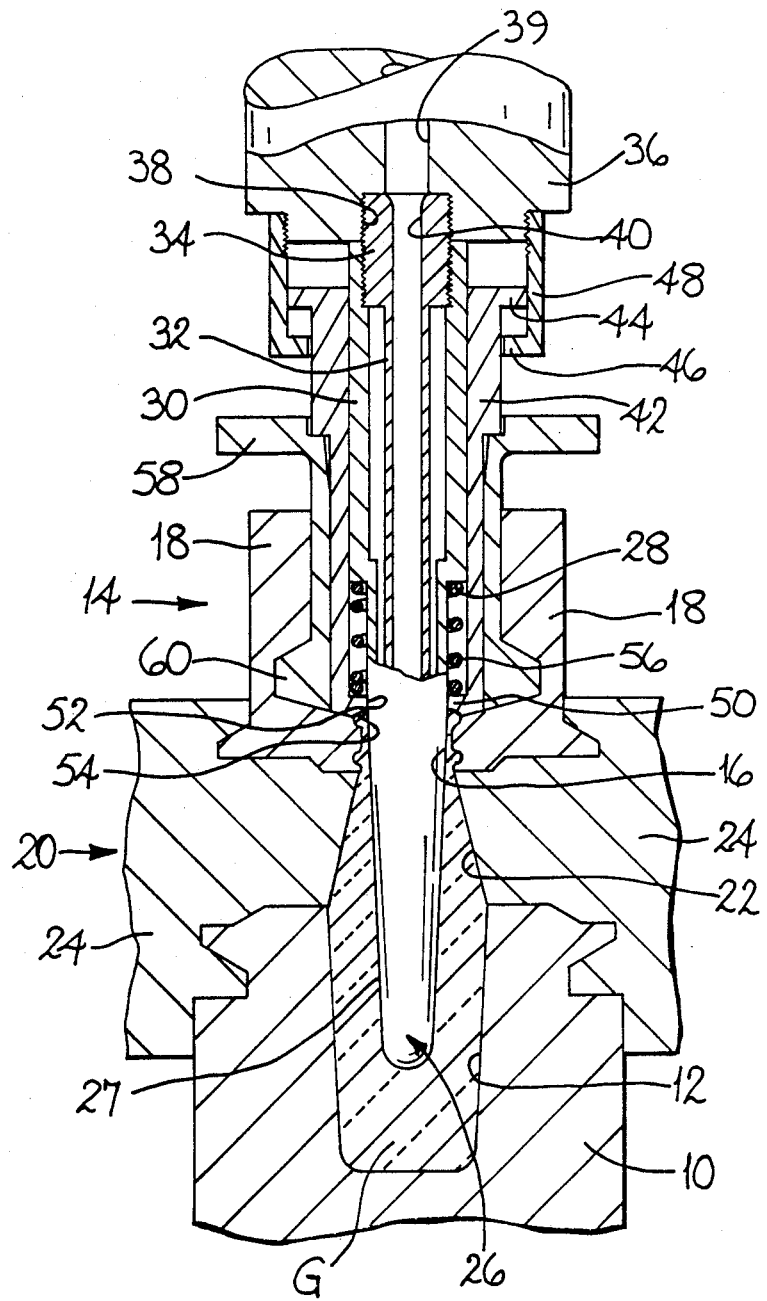

MANUFACTURE OF PARISONS OF MOLTEN GLASS

BACKGROUND OF THE INVENTION

This invention is concerned with a method of manufacturing a parison of molten glass for subsequent moulding into a glass container and with parison moulding apparatus for moulding such parisons.

In the manufacture of glass containers, it is common practice to mould a gob of molten glass into an intermediate shape, known as a parison, in a first mould and then to transfer the parison to a second mould in which the parison is moulded into a glass container. One method of manufacturing such parisons which have wide necks is described in G.B. patent specification No. 1491859. In this method, a mould having a mould cavity which defines the desired shape of the parison is assembled. The mould, which has its neck facing upwardly, comprises a one-piece lower mould portion defining a lower portion of the mould cavity. The lower mould portion is mounted for movement upwardly into a mould-assembled position thereof or downwardly into a parison-releasing portion thereof. The mould also comprises a dividable neck ring defining a neck portion of the mould cavity. The neck ring comprises two neck ring halves which are mounted on a carriage for horizontal movement between an engaged position of the halves in which they cooperate in defining the neck portion and a separated position of the halves in which the parison can be removed. The mould also comprises a dividable central mould portion which comprises two halves which are movable horizontally to an engaged position in which the halves engage one another, the lower mould portion, and the neck ring to cooperate in defining the mould cavity and to a separated position in which the parison can be removed.

In the method of G.B. patent specification No. 1491859, when the mould has been assembled, a gob of molten glass is introduced into the mould cavity through the neck ring. Then, a vertically-disposed plunger is moved horizontally into alignment with the neck ring and then downwardly through the neck ring and into the mould cavity. The plunger presses the glass into conformity with the mould cavity thereby forming the parison. The plunger is then withdrawn from the mould. Then, the two halves of the central mould portion are moved to their separated position and the lower mould portion is moved downwardly clear of the parison. The parison is now supported by the neck ring which is moved horizontally to carry away the parison.

In the method of G.B. patent specification No. 1491859, the neck ring defines the sealing surface of the neck portion of the mould cavity, the sealing surface being the uppermost surface of the parison against which a cap of the container seals the completed container. This method, however, cannot be used to make narrow neck parisons because the neck ring would not be sufficiently wide to allow the gob to enter the mould cavity. Instead, for a narrow neck parison, the gob is introduced into the lower mould portion before assembly of the mould, the mould is then assembled and the method then continued as for a wide neck parison. An example of this method is described in European patent specification No. 0102001. This method, however, has the disadvantages that the time between gob loading and pressing is increased slowing up the moulding process and that the glass is in contact with the lower mould portion longer than with the remainder of the mould so that the parison has less temperature uniformity. In U.S. Pat. No. 4,288,240, a modification of the method of the aforementioned G.B. patent specification No. 1491859 is illustrated, in this modification a gob guide is engaged by the neck ring and serves to guide gobs through the neck ring into the mould cavity. The gob guide defines the sealing surface of the mould cavity. However, in this modification, the width of the gob guide is limited making gob feeding less easy.

It is an object of the present invention to provide a method of the type described of manufacturing a narrow neck parison in which the gob can be easily loaded through the neck ring.

BRIEF DESCRIPTION OF THE INVENTION

The invention provides a method of manufacturing a parison of molten glass for subsequent moulding into a glass container comprising:

assembling a mould having a mould cavity which defines the desired shape of the parison the mould comprising a one-piece lower mould portion defining a lower portion of the mould cavity, a dividable neck ring defining a neck portion of the mould cavity and engaging a gob guide arranged to guide gobs into the mould cavity, and a dividable central mould portion engaging the neck ring and the lower mould portion and defining a central portion of the mould cavity;

introducing a gob of molten glass into the gob guide so that the gob passes into the mould cavity through the neck ring;

introducing into the gob guide a plunger guide which serves to guide a plunger through the neck ring and which defines a sealing surface of the neck portion of the mould cavity;

pressing the plunger guide downwardly on to the neck ring, introducing a plunger into the plunger guide so that the plunger enters the mould cavity through the neck ring so that the plunger presses the molten glass into conformity with the cavity;

withdrawing the plunger from the mould and the plunger guide from the gob guide; and disassembling the mould to allow removal of the parison.

In a method according to the last preceding paragraph, the sealing surface of the neck portion of the mould cavity is not defined by the neck ring or the gob guide so that additional width is available through which the gob can pass.

Preferably, the plunger guide is moved with the plunger towards the mould until it engages the neck ring. This arrangement simplifies the apparatus necessary.

The invention also provides parison moulding apparatus for use in manufacturing a parison of molten glass for subsequent moulding into a glass container comprising a mould comprising a one-piece lower mould portion defining a lower portion of a mould cavity, a dividable neck ring defining a neck portion of the mould cavity, a dividable central mould portion defining a central portion of the mould cavity, the apparatus also comprising mould assembling means for assembling the lower portion, the neck ring and the central portion to form the mould in which a parison can be moulded and for disassembling the mould to allow removal of the parison, a gob guide engageable by the neck ring arranged to guide gobs of molten glass into the mould cavity, a plunger and means for moving the plunger into the mould cavity through the neck ring to press molten glass in the mould cavity into conformity with the mould cavity, the apparatus also comprising a plunger guide arranged to be introduced into the gob guide, to guide the plunger in its motion through the neck ring and to define a sealing surface of the neck portion of the mould cavity, and pressing means operable to press the plunger guide downwardly on to the neck ring while the plunger is in the mould.

BRIEF DESCRIPTION OF THE DRAWINGS

There now follows a detailed description, to be read with reference to the accompanying drawing, of a method of manufacturing a parison and of a parison moulding apparatus which are illustrative of the invention. It is to be understood that the illustrative method and apparatus have been selected for description by way of example and not of limitation of the invention.

The drawing is a vertical cross-sectional view taken through the illustrative apparatus.

DETAILED DESCRIPTION OF PREFERRED EMBODIMENT OF THE INVENTION

The illustrative parison moulding apparatus is for use in manufacturing a parison of molten glass for subsequent moulding into a glass container. The illustrative apparatus forms part of a machine of the type described in G.B. patent specification No. 1491859, the illustrative apparatus being substituted for the parison moulding apparatus shown in FIG. 4 of that specification.

The illustrative apparatus comprises a one-piece lower mould portion 10 which is in the shape of an upwardly-opening cup. The portion 10 defines a lower portion 12 of a mould cavity of the apparatus. The lower mould portion 10 is mounted for movement between an upper and a lower position on the piston of a vertically-disposed piston and cylinder assembly (not shown) which forms part of mould assembling means of the illustrative apparatus.

The illustrative apparatus also comprises a dividable neck ring 14 defining a neck portion 16 of the mould cavity. The neck ring 14 comprises two neck ring halves 18 which are mounted on a carriage (not shown) and are movable towards or away from one another horizontally in the manner described in the aforementioned G.B. specification No. 1491859.

The apparatus also comprises a dividable central mould portion 20 defining a central portion 22 of the mould cavity. The central mould portion 20 comprises two halves 24 which are mounted for movement towards and away from one another in the manner described in the aforementioned G.B. specification No. 1491859.

The illustrative apparatus, thus, comprises a mould which comprises the lower mould portion 10, the neck ring halves 18, and the central portion halves 24 and mould assembling means for assembling these parts to form the mould in which the parison can be moulded and for disassembling the mould to allow removal of the parison. To assemble the mould, piston and cylinder assemblies are operated to move the carriage so that the neck ring halves 18 are in the same vertical plane as the lower mould portion 10 and the central portion halves 24, to raise the lower mould portion 10 to its upper position, to move the neck ring halves 18 into engagement with each other, and to move the central portion halves 24 into engagement with one another and with the lower mould portion 10 and the neck ring halves 18. After the parison has been moulded in the mould 12,22,16, the mould is disassembled by operating the piston and cylinder assemblies to separate the central portion halves 24, lowering the lower portion 10 to its lower position, to move the carriage horizontally so that the parison supported by the neck ring halves 18 is transported away, and to separate the neck ring halves 18 to release the parison for further processing.

The illustrative parison moulding apparatus also comprises a plunger 26 and means for moving the plunger into the mould cavity 12,22,16 through the neck ring 14 to press molten glass in the mould cavity into conformity with the mould cavity. The plunger 26 has a rounded lower tip and a smooth slightly conical outer surface 27 which terminates at a shoulder 28 with an upper cylindrical portion 30 of the plunger 26 of increased diameter. The plunger 26 is hollow and contains a cooling air tube 32 which has a cylindrical externally-threaded base 34 on which the cylindrical portion 30 is threadedly-received. The base 34 also serves to secure the plunger 26 to a piston rod 36 being threadably-received in a recess 38 in the bottom of the piston rod 36. The piston rod 36 forms part of a vertically-disposed piston and cylinder assembly (not shown) which provides means for moving the plunger 26 into the mould cavity. This piston and cylinder is also movable by a horizontally-disposed piston and cylinder assembly (not shown) into and out of vertical alignment with the mould cavity. A passage 39 in the rod 36 supplies cooling air to a passage 40 through the base 34 which connects to the tube 32.

The illustrative parison moulding apparatus also comprises a plunger guide 42 which is telescopically-received on the cylindrical portion 30. The plunger guide 42 is slidable vertically on the portion 30 being retained by an upper external flange 44 of the guide 42 which engages an internal flange 46 of an attaching collar 48 which depends from the piston rod 36.

The plunger guide 42 is arranged to guide the plunger 26 in its motion through the neck ring 14.

An internal flange 50 of the plunger guide 42 at a lower end thereof has a cylindrical inner surface 52 which guides the surface 27 of the plunger 26. A lower surface 54 of the flange 50 defines a sealing surface of the neck portion 16 of the mould cavity.

The illustrative parison moulding apparatus also comprises pressing means operable to press the plunger guide 42 downwardly on to the neck ring 14 while the plunger 26 is in the mould. This pressing means is constituted by a spring 56 acting between the shoulder 28 of the plunger 26 and the flange 50 of the plunger guide 42.

The illustrative parison moulding apparatus also comprises a gob guide 58 engageable by the neck ring 14 arranged to guide gobs of molten glass into the mould cavity through the neck ring 14. The guide ring 58 is supported on the carriage and is arranged to telescopically receive the plunger guide 42 and has an external flange 60 which is engaged by matching grooves on the neck ring halves 18.

The illustrative parison moulding apparatus is used in the illustrative method of manufacturing a parison of molten glass G for subsequent moulding into a glass container. The illustrative method comprises assembling the mould as described above from the lower mould portion 10, the neck ring 14, and the central mould portion 18, with the gob guide 58 engaged by the neck ring 14 and introducing a gob of molten glass into the gob guide 58 so that the gob passes into the mould cavity 12,22,16 through the neck ring 14.

Next, in the illustrative method, plunger guide 42 is introduced into the gob guide 58 and pressed downwardly on to the neck ring 14. Then the plunger 26 is introduced into the gob guide 58 so that the plunger enters the mould cavity 12,22,16 through the neck ring 14. To do this, the plunger guide 42 and the plunger 26 are moved horizontally into alignment with the neck ring 14 and then downwardly through into the gob guide 58. The plunger is guided through the surface 16 by the surface 52 of the plunger guide 42. Once in the mould cavity, the plunger 26 forces the molten glass into conformity with the surfaces 12,22,16 and 54 thereby forming the parison.

During the movement of the plunger 26 towards the neck ring 14, the plunger guide 42 moves with the plunger 26 entering the gob guide 58. During this movement of the plunger guide 42, the action of the spring 56 holds the flanges 44 and 46 in engagement. When the lower end of the plunger guide 42 has passed through the gob guide ring 58, it engages the guide ring 14 and comes to a halt. Continued movement of the plunger 26 is accommodated by compression of the spring 56. The spring 56 then serves to hold the plunger guide 42 against being lifted by pressure from the glass against the surface 54. Thus, during pressing of the molten glass by the plunger 26, the plunger guide 42 is pressed downwardly on to the neck ring 14.

After the parison has been pressed, the plunger guide 42 and the plunger 26 are withdrawn by reversing their previous movement with the flange 46 lifting the flange 44 and the mould is disassembled as described above.

I claim:

1. A method of manufacturing a parison of molten glass for subsequent moulding into a glass container comprising:

assembling a mould having a mould cavity which defines the desired shape of the parison, the mould comprising a one-piece lower mould portion defining a lower portion of the mould cavity, a dividable neck ring defining a neck portion of the mould cavity and engaging a gob guide arranged to guide gobs into the mould cavity, and a dividable central mould portion engaging the neck ring and the lower mould portion and defining a central portion of the mould cavity;

introducing a gob of molten glass into the gob guide so that the gob passes into the mould cavity through the neck ring;

introducing into the gob guide a plunger guide which serves to guide a plunger through the neck ring and which defines a sealing surface of the neck portion of the mould cavity;

pressing the plunger guide downwardly on to the neck ring, introducing a plunger into the plunger guide so that the plunger enters the mould cavity through the neck ring so that the plunger presses the molten glass into conformity with the cavity;

withdrawing the plunger from the mould and the plunger guide from the gob guide; and disassembling the mould to allow removal of the parison.

2. A method according to claim 1, wherein the plunger guide is moved with the plunger towards the mould until it engages the neck ring.

3. Parison moulding apparatus for use in manufacturing a parison of molten glass for subsequent moulding into a glass container comprising a mould comprising a one-piece lower mould portion defining a lower portion of a mould cavity, a dividable neck ring defining a neck portion of the mould cavity, a dividable central mould portion defining a central portion of the mould cavity, the apparatus also comprising mould assembling means for assembling the lower portion, the neck ring and the central portion to form the mould in which a parison can be moulded and for disassembling the mould to allow removal of the parison, a gob guide engageable by the neck ring arranged to guide gobs of molten glass into the mould cavity, a plunger, and means for moving the plunger into the mould cavity through the neck ring to press molten glass in the mould cavity into conformity with the mould cavity, the apparatus also comprising a plunger guide arranged to be introduced into the gob guide, to guide the plunger in its motion through the neck ring and to define a sealing surface of the neck portion of the mould cavity, and pressing means operable to press the plunger guide downwardly on to the neck ring while the plunger is in the mould.

4. Parison moulding apparatus according to claim 3, wherein said pressing means comprises a spring acting between the plunger guide and the plunger.

5. Parison moulding apparatus according to claim 3, wherein said plunger guide is mounted for movement with said plunger towards the mould until it engages the neck ring.

* * * * *